United States Patent
Otsuki et al.

(10) Patent No.: US 8,401,291 B2
(45) Date of Patent: Mar. 19, 2013

(54) IMAGE PROCESSING THAT IMPROVES CONTRAST IN LIGHT AND DARK PORTIONS OF AN IMAGE

(75) Inventors: Seichi Otsuki, Kanagawa (JP); Nobuhiro Tsunashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 193 days.

(21) Appl. No.: 12/959,433

(22) Filed: Dec. 3, 2010

(65) Prior Publication Data

US 2011/0142342 A1 Jun. 16, 2011

(30) Foreign Application Priority Data

Dec. 10, 2009 (JP) ................ P2009-280877

(51) Int. Cl.
G06K 9/38 (2006.01)
G06K 9/00 (2006.01)

(52) U.S. Cl. ........................................ 382/172

(58) Field of Classification Search ............ 382/162, 382/164, 168, 172, 190, 218–220, 284; 348/222.1, 348/223.1, 229.1, 230.1, 362, 364, E05.037; 345/87, 102, 204, 690; 358/522, 530
See application file for complete search history.

(56) References Cited

U.S. PATENT DOCUMENTS

| | | | |
|---|---|---|---|
| 5,042,077 A * | 8/1991 | Burke | 382/169 |
| 7,006,668 B2 * | 2/2006 | Iguchi et al. | 382/108 |
| 7,612,758 B2 * | 11/2009 | Yang | 345/102 |
| 7,944,485 B2 * | 5/2011 | Ovsiannikov | 348/229.1 |
| 8,009,224 B2 * | 8/2011 | Umeda | 348/362 |
| 2010/0328491 A1 * | 12/2010 | Ovsiannikov | 348/229.1 |
| 2011/0142342 A1 * | 6/2011 | Otsuki et al. | 382/172 |
| 2011/0194766 A1 * | 8/2011 | Otsuki | 382/168 |

* cited by examiner

*Primary Examiner* — Amir Alavi
(74) *Attorney, Agent, or Firm* — Frommer Lawrence & Haug LLP; William S. Frommer

(57) ABSTRACT

Provided is an image processing apparatus which includes a block histogram generation unit configured to calculate frequency of a pixel value in each block, divide a dynamic range, and generate a first histogram including "N" number of bins, a pixel histogram generation unit configured to calculate frequency of a target pixel in a block based on first histograms of the block including the target pixel and a block adjacent to the block including the target pixel, and generate a second histogram including "N" number of bins for each pixel, and an output value determination unit configured to generate a relation between the pixel value and an output value of the pixel value based on the second histogram so that a maximum cumulative frequency of the second histogram matches a maximum value of the output value, and calculate the output value based on the pixel value of the target pixel.

8 Claims, 13 Drawing Sheets

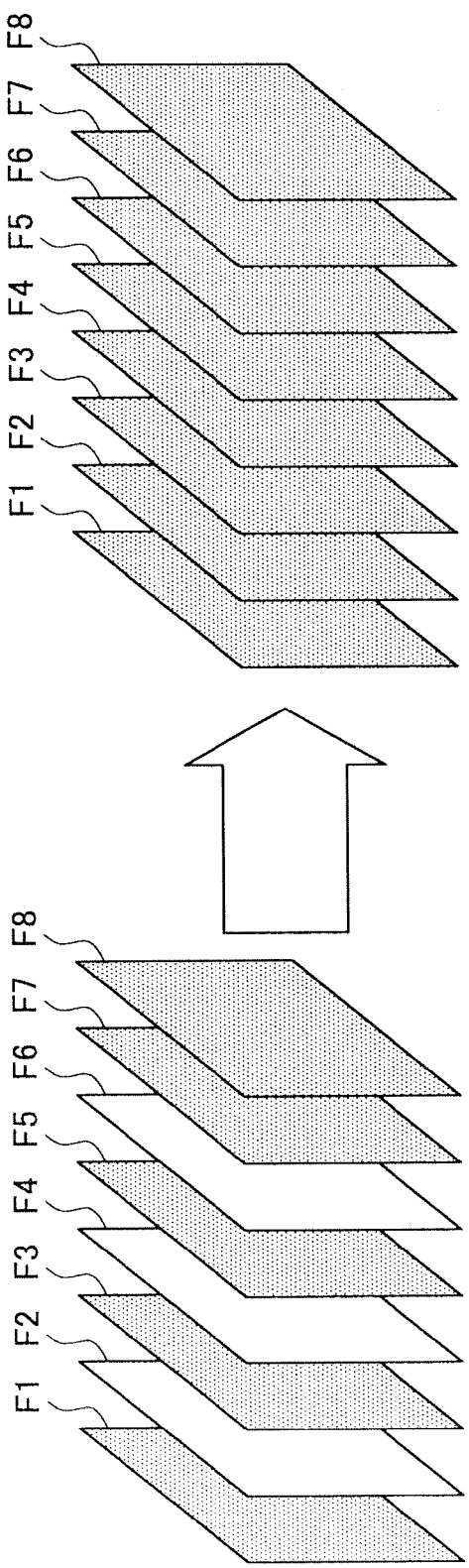

IMAGE PROCESSING THAT IMPROVES CONTRAST IN LIGHT AND DARK PORTIONS OF AN IMAGE

BACKGROUND OF THE INVENTION

1. Field of the Invention

The present invention relates to an image processing apparatus, an image processing method and a program.

2. Description of the Related Art

When an image is shown on a display, if the image is a wide dynamic range image or a high-contrast image, there may be generated a part having a small brightness difference and a low contrast so that the image on the display is unclear, as shown in FIG. 6A. For example, the brightness difference between an outdoor environment and a person therein as shown in FIG. 6A may be small and the brightness difference between an indoor environment and a person therein as shown in FIG. 6A may be small. The phenomenon of an unclear image caused by a small brightness difference occurs in both a light area and a dark area. FIGS. 6A and 6B are explanatory diagrams showing examples of an image.

To improve the contrast of a part having a small brightness difference, a tone correction is performed on the image in general. A related technique of a tone correction is described in, for example, Frédo Durand and Julie Dorsey, Fast Bilateral Filtering for the Display of High-Dynamic-Range Images, In SIGGRAPH '02: Proceedings of the 29th annual conference on Computer graphics and interactive techniques (2002), pp. 257-266. In the technique of the above document, a tone correction is performed on each area or each pixel of a wide dynamic range image.

SUMMARY OF THE INVENTION

There are two tone corrections in image processing: (1) linear processing such as a gain adjustment or a gamma correction, and (2) histogram equalization.

When a tone correction by linear processing such as a gain adjustment and a gamma correction is performed in a large image having a high contrast, a correction of the contrast in a dark part sacrifices the contrast in a light part and, in contrast, a correction of the contrast in the light part sacrifices the contrast in the dark part. Further, when the tone correction by linear processing such as a gain adjustment and a gamma correction is performed on a wide dynamic range image, the width of the dynamic range is not used effectively in a corrected image.

In a tone correction by histogram equalization, contrast is improved but the continuity of brightness is lost so that the display image may be an unnatural image. Further, in histogram equalization, it is important to analyze every output bit and large amounts of hardware and software resources are used in a case of a high resolution image. Further, when a tone correction by histogram equalization is performed, the contrast is lowered in a region having a brightness level of a small area with respect to the entire image.

When a tone correction is performed for each region and each pixel as described in the above document, in general, extremely large amounts of hardware and software resources are used.

For example, in a monitoring system using a security camera or the like, there is a need to improve the visibilities in a light part and a dark part even in a case of a wide dynamic range image or a high-contrast image.

In light of the foregoing, it is desirable to provide a novel and improved image processing device, image processing method and program capable of improving contrast in both a light part and a dark part in a single image and reducing a circuit load.

According to an embodiment of the present invention, there is provided an image processing apparatus including a block histogram generation unit configured to calculate frequency of a pixel value in each block including plural pixels, divide a dynamic range into plural "N" numbers (N is an integer), and generate a first histogram including "N" number of bins having a width of plural pixels, a pixel histogram generation unit configured to calculate frequency of a target pixel depending on a pixel position of the target pixel in a block based on the first histogram of the block including the target pixel and the first histogram of a block adjacent to the block including the target pixel, and generate a second histogram including "N" number of bins for each pixel, and an output value determination unit configured to generate a relation between the pixel value and an output value of the pixel value based on the second histogram so that a maximum cumulative frequency of the second histogram matches a maximum value of the output value of the pixel value, and calculate the output value based on the pixel value of the target pixel.

The block histogram generation unit may weight the frequency according to the pixel value.

The block histogram generation unit may add the frequency to a bin adjacent to the bin including the pixel value according to the pixel value.

The pixel histogram generation unit may normalize by a distance between the target pixel and a center of the adjacent block, combine the first histogram of the block including the target pixel and the first histogram of the block adjacent to the block including the target pixel, and generate the second histogram.

The pixel histogram generation unit may calculate frequency of a pixel value of the entire image, divide a dynamic range into the plural "N" numbers (N is an integer) to generate a third histogram including "N" number of bins having a width of plural pixels, and generate the second histogram by combining the third histogram.

The relation between the pixel value and the output value of the pixel value may be obtained by linking lines that connect frequencies of a minimum pixel value and a maximum pixel value within a single bin width.

According to another embodiment of the present invention, there is provided an image processing method including the steps of calculating frequency of a pixel value of each block including plural pixels, dividing a dynamic range into plural "N" numbers (N is an integer), and generating a first histogram including "N" number of bins having a width of plural pixel values, calculating frequency of a pixel value depending on a pixel position of a target pixel in a block based on the first histogram of the block including the target pixel and the first histogram of a block adjacent to the block including the target pixel, and generating a second histogram including "N" number of bins for each pixel, and generating a relationship between the pixel value and an output value of the pixel value based on the second histogram so that a maximum cumulative frequency of the second histogram matches a maximum value of the output value of the pixel value, and calculating the output value based on the pixel value of the target pixel.

According to another embodiment of the present invention, there is provided a program that causes a computer to function as a means for calculating frequency of a pixel value of each block including plural pixels, dividing a dynamic range into plural "N" numbers (N is an integer), and generating a first histogram including "N" number of bins having a width of plural pixel values a means for calculating frequency of a pixel value depending on a pixel position of a target pixel in a block based on the first histogram of the block including the target pixel and the first histogram of a block adjacent to the block including the target pixel, and generating a second histogram including "N" number of bins for each pixel, and a means for generating a relationship between the pixel value and an output value of the pixel value based on the second histogram so that a maximum cumulative frequency of the second histogram matches a maximum value of the output value of the pixel value, and calculating the output value based on the pixel value of the target pixel.

As described above, according to the present invention, contrast in both a light part and a dark part in a single image can be improved and a circuit load can be reduced.

BRIEF DESCRIPTION OF THE DRAWINGS

FIGS. 13A and 13B are explanatory diagrams showing a plurality of frame images.

DETAILED DESCRIPTION OF THE EMBODIMENT

Figure 1:
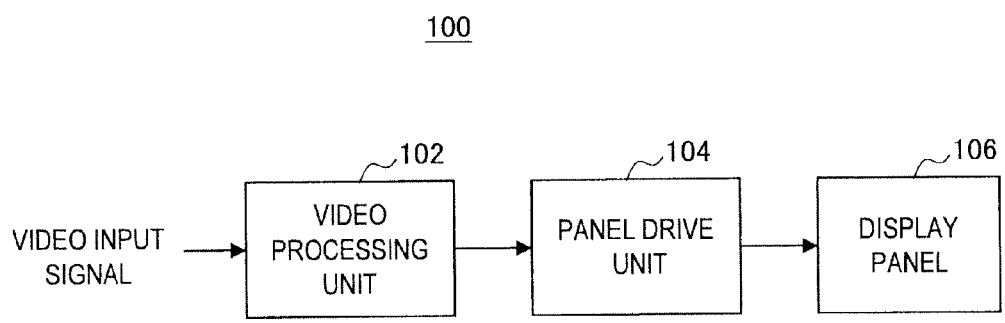
FIG. 1 is a block diagram showing a display device 100 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
1. Configuration of One Embodiment
2. Operation of One Embodiment
<1. Configuration of One Embodiment>

A display device 100 according to an embodiment of the present invention will be explained with reference to FIG. 1. FIG. 1 is a block diagram showing the display device 100 according to the embodiment.

The display device 100 is a television receiver, a monitor or the like for example. As shown in FIG. 1, the display device 100 includes a video processing unit 102, a panel drive unit 104, a display panel 106 and the like, for example.

The video processing unit 102 receives a video input signal and executes image processing on the video input signal to generate a display signal. For example, the image processing includes a tone correction, a contour detection, smoothing processing, and the like. The video processing unit 102 is an example of an image processing apparatus.

The panel drive unit 104 receives the display signal generated by the video processing unit 102 and generates a drive signal.

The display panel 106 is for example a liquid crystal display panel, an organic EL display panel or the like. The display panel 106 displays a video on a screen based on the drive signal generated by the panel drive unit 104. In the display panel 106, a plurality of pixels are arranged in a matrix.

Figure 2:
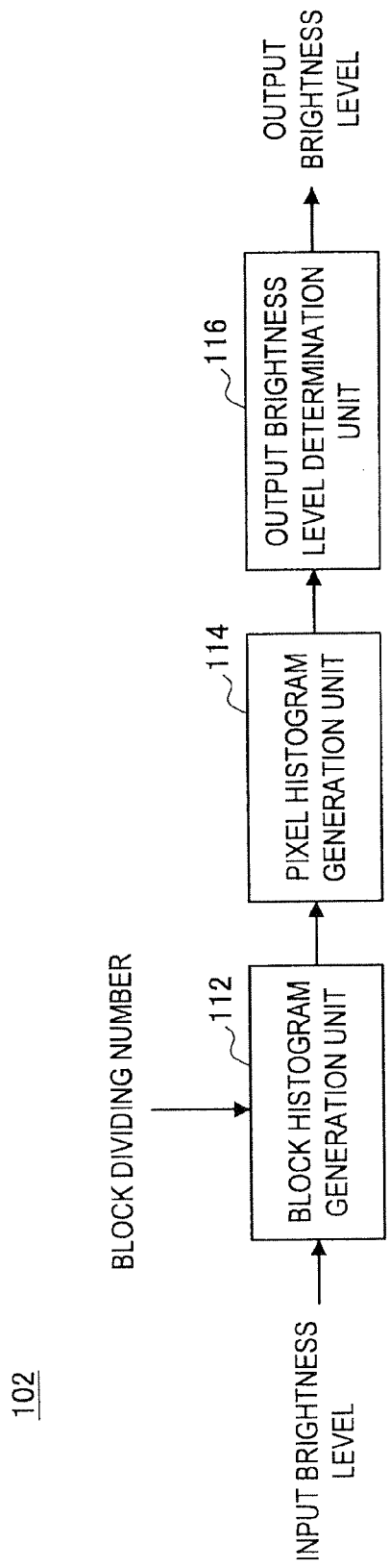
FIG. 2 is a block diagram showing a video processing unit 102 according to the embodiment.

Next, the video processing unit 102 according to this embodiment will be explained with reference to FIG. 2. FIG. 2 is a block diagram showing the video processing unit 102 according to this embodiment.

Regarding a high contrast image in which areas of different lighting environments are mixed for example, the video processing unit 102 corrects to balance out the differences of lighting environments to clearly show a user both the light part and the dark part at the same time.

The video processing unit 102 includes a block histogram generation unit 112, a pixel histogram generation unit 114, an output brightness level determination unit 116, and the like.

To the block histogram generation unit 112, a brightness value (an input brightness level) of the video input signal is input on a pixel basis. The brightness value is an example of a pixel value. Further, to the block histogram generation unit 112, a dividing number used to divide an image into blocks is input. A block is a collection of plural pixels. The block size is an area of about 1 to 2% of the entire image, for example. Note that the block size can be changed according to the type of hardware such as a memory provided in the display device 100.

Figure 7:
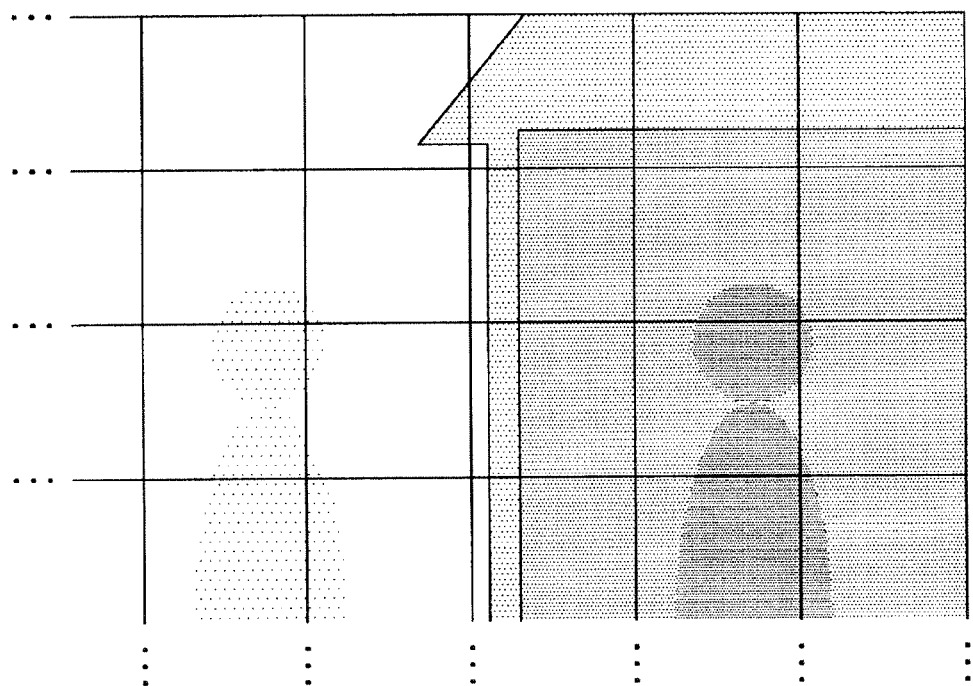
FIG. 7 is an explanatory diagram showing a division of an image.

The block histogram generation unit 112 divides the entire image into a plurality of blocks based on the dividing number as shown in FIG. 7. FIG. 7 is an explanatory diagram showing a division of an image. The block histogram generation unit 112 counts frequency of the brightness values in each block and generates a histogram of each block. Here, a first cumulative histogram is generated by dividing a dynamic range of the brightness value into a plurality of ("N" number of) ranges. In other words, a width of a bin in the first cumulative histogram is formed of plural brightness values and the first cumulative histogram includes "N" number of bins. This first cumulative histogram is an example of a first histogram.

Figure 9:
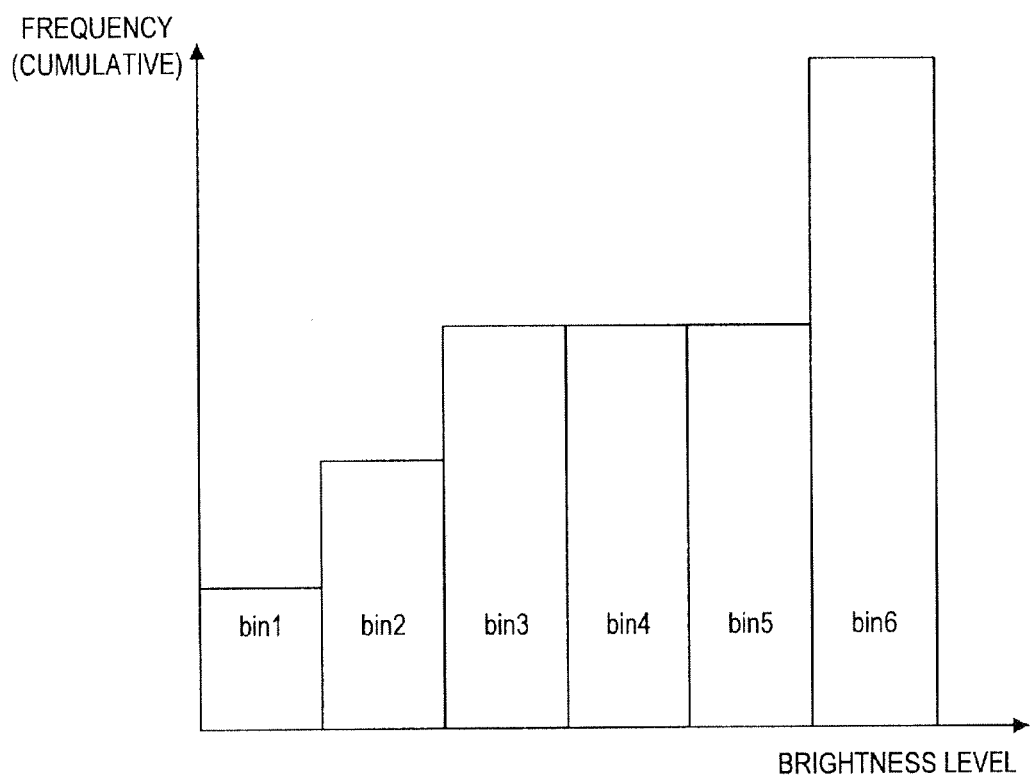
FIG. 9 is a graph showing a first cumulative histogram.

FIG. 9 shows the first cumulative histogram in which the brightness values (the brightness levels) are divided into six sections. FIG. 9 is a graph showing the first cumulative histogram. The dividing number "N" used to divide the dynamic range of the brightness value can be changed according to the type of hardware such as a memory provided in the display device 100. Further, the dividing number "N" is determined according to the size of the dynamic range. The width of a single bin of the first cumulative histogram is set based on a logarithmic number and this easily covers a wide dynamic range represented by indexes.

When generating the first cumulative histogram, the block histogram generation unit 112 weights the frequency according to the brightness value. Further, the block histogram generation unit 112 adds the frequency to peripheral bins such as an adjacent bin according to the brightness value. When the width of each bin is wide and the frequency of the brightness values is biased at a border area with an adjacent bin, a later-described tone curve is not generated properly. Since the frequency is added to peripheral bins according to the brightness value, the frequency can be balanced even when the bin has a wide width, and a proper tone curve can be generated.

The pixel histogram generation unit 114 generates a second cumulative histogram on a pixel basis by combining a first cumulative histogram of a block including a target pixel with first cumulative histograms of peripheral blocks. This second cumulative histogram is an example of a second histogram. The second cumulative histogram includes "N" number of bins, same as the first cumulative histogram.

When a second cumulative histogram is generated by combining the first cumulative histograms, the second cumulative histogram is calculated depending on the pixel position of the target pixel in the block. This prevents the unnatural discontinuity of the brightness values between the target pixel and adjacent pixel.

Further, the pixel histogram generation unit 114 calculates frequency of the pixel value of the entire image and generates a third cumulative histogram including "N" number of bins, same as the first cumulative histogram. The third cumulative histogram of the entire image is an example of a third histogram. The pixel histogram generation unit 114 generates a second cumulative histogram by combining the third cumulative histogram on a pixel basis. The combining is executed in a certain proportion, for example, in a proportion of 1 to 1.

Figure 11A:
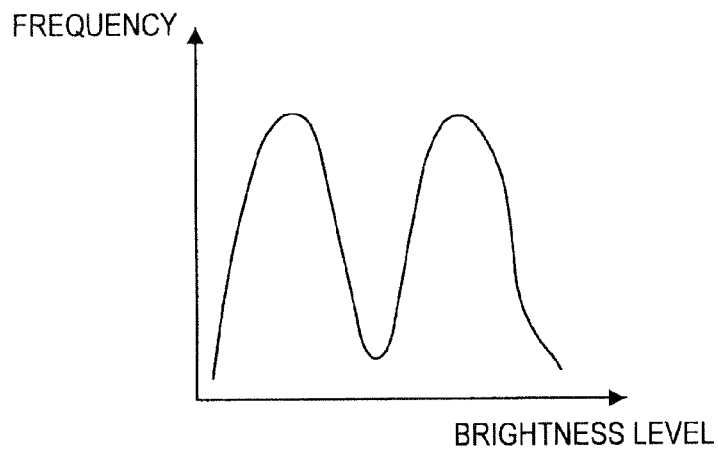
FIGS. 11A to 11C are graphs showing histograms.
Figure 11B:
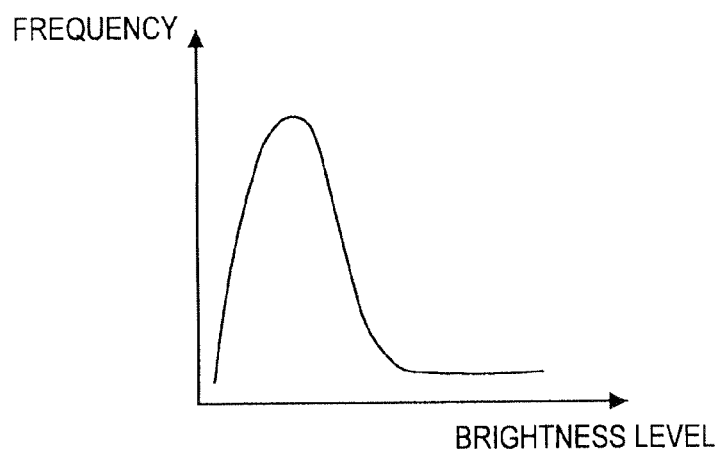

A case will be considered in which there are a dark part and a light part in an image, as shown in the histogram of FIG. 11A for example. FIG. 11A is a graph showing a histogram of the entire image. Here, a histogram of a block in the light part (a partial histogram) is shown in FIG. 11B. FIG. 11B is a graph showing a partial histogram. Thus, when the pixel histogram generation unit 114 does not combine the third cumulative histogram of the entire image, the second cumulative histogram may be a histogram which does not reflect the contrast of the entire image.

Further, when a time constant is used in a case of a moving image, the third cumulative histogram of the entire image includes a smooth change of brightness of the entire image in chronological order. This configuration prevents an influence of a partial brightness change in a moving image from being imposed on the brightness change of the entire image and prevents an instantaneous change of the brightness of the entire image.

Figure 11C:
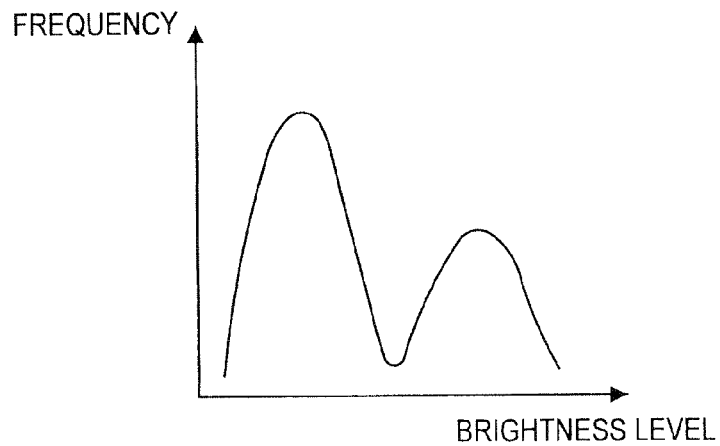

On the other hand, a histogram shown in FIG. 11C is obtained by combining the histogram of the entire image shown in FIG. 11A and the partial histogram shown in FIG. 11B. Thus, when the pixel histogram generation unit 114 combines the third cumulative histograms of the entire image, the second cumulative histogram can be a histogram reflecting the contrast of the entire image.

In other words, a partial cumulative histogram generated for each block produces an unnatural image in which the contrast in the entire image has been lost; however, when the third cumulative histogram of the entire image is combined, the original contrast is maintained and a natural image can be produced.

Figure 12:
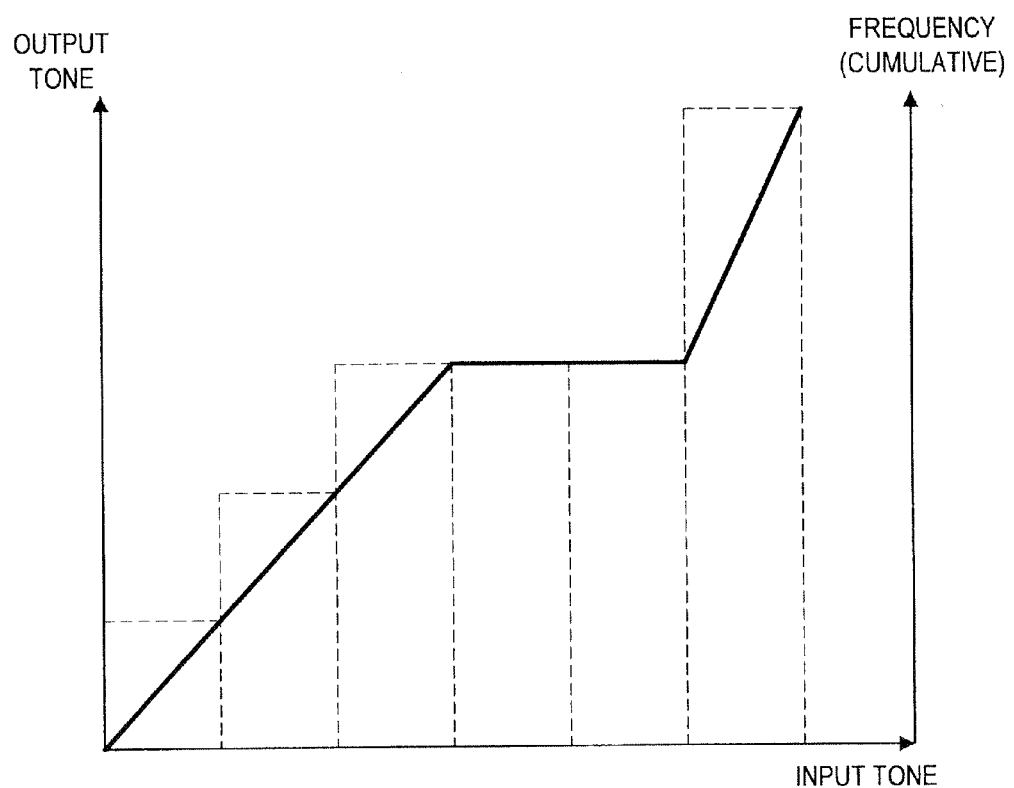
FIG. 12 is a graph showing a tone curve and a cumulative histogram.

The output brightness level determination unit 116 generates a relation (a tone curve) between an input brightness value and an output brightness value of each pixel based on the second cumulative histogram generated for each pixel. Then, the output brightness level determination unit 116 determines the output brightness value of each pixel from the input brightness value based on the tone curve of each pixel. When a tone curve is generated, a maximum cumulative frequency of the second cumulative histogram, that is, the number of pixels of the entire image, is made to correspond to the maximum value of the output brightness value, as shown in FIG. 12. Then, an output brightness value is allocated according to the frequency value of the second cumulative histogram.

As a result, as shown in FIG. 12, in a range of input brightness values having no pixels, the tone curve becomes flat and, in a range of input brightness values having pixels, the tone curve becomes linear for example. FIG. 12 is a graph showing a tone curve and a cumulative histogram. As shown in FIG. 12, the tone curve links lines, for all bins, which connect cumulative frequencies at the minimum pixel value within each bin and cumulative frequencies at the maximum pixel value within each bin. Since the output brightness level determination unit 116 determines output brightness values of all pixels, an image formed of output brightness values which are tone-transformed from the input brightness values is generated.

<2. Operation of One Embodiment>

Figure 3:
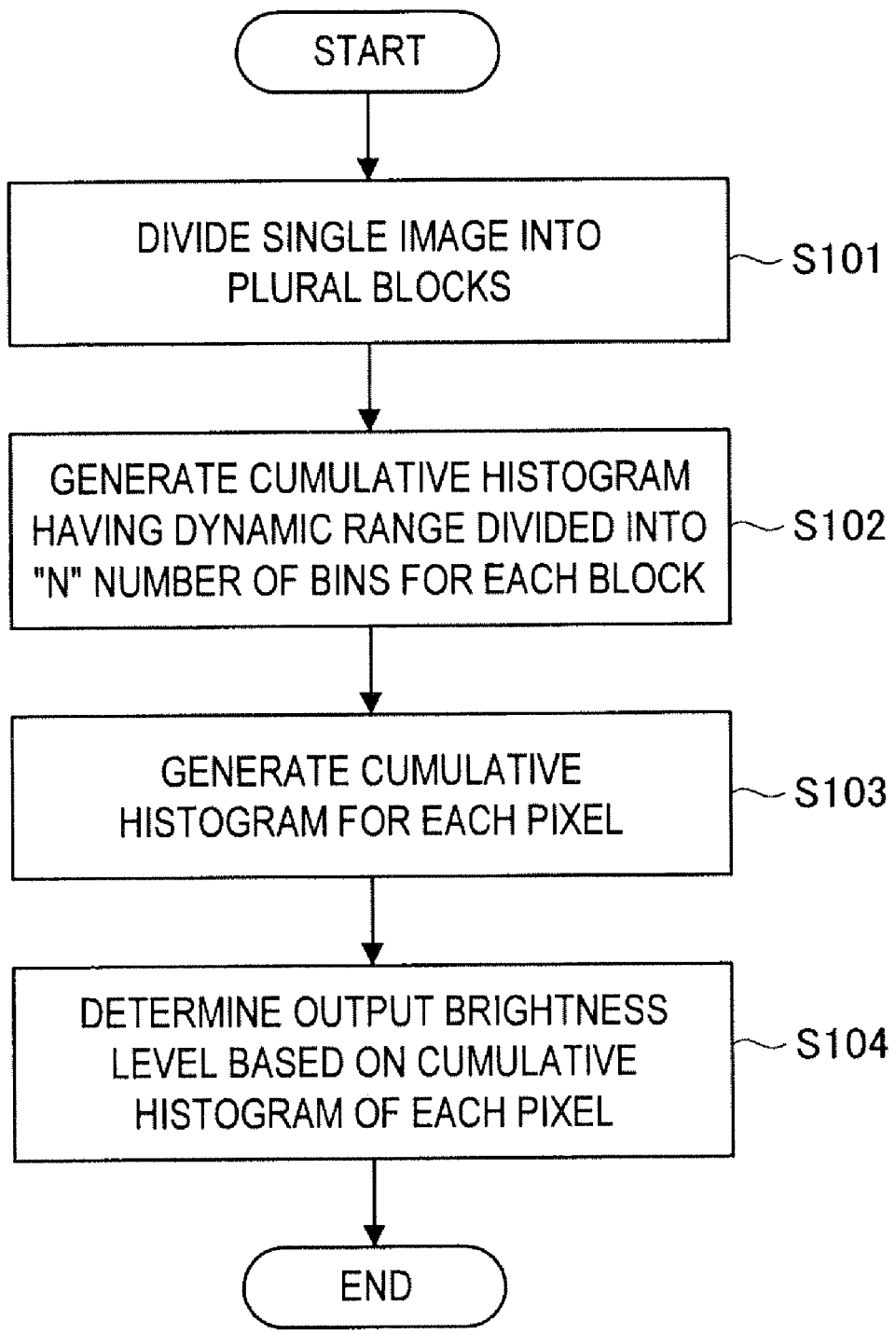
FIG. 3 is a flowchart showing a tone transformation process by the video processing unit 102 according to the embodiment.

A tone transformation processing operation according to this embodiment will be explained with reference to FIG. 3. FIG. 3 is a flowchart of tone transformation processing by the video processing unit 102 according to this embodiment.

As shown in FIG. 7, an image is divided into plural blocks (step S101). The dividing number is a previously-determined value.

Next, in each block, a first cumulative histogram dividing a dynamic range of the brightness value into "N" number of bins is generated as shown in FIG. 9 (step S102). Here, a frequency value is weighed according to a brightness value. A process of generating a second cumulative histogram including a weighting process will be described later.

After that, a second cumulative histogram is generated for each pixel by combining a first cumulative histogram of a block including a target pixel and first cumulative histograms of peripheral blocks. Further, a third cumulative histogram is generated by calculating frequency of pixel values of the entire image, and a second cumulative histogram is generated by combining the third cumulative histogram on a pixel basis (step S103). When the first cumulative histogram of the block including the target pixel and the first cumulative histograms of the peripheral blocks are combined, the second cumulative histogram is calculated depending on the pixel position of the target pixel in the block. The process of generating the second cumulative histogram will be described later.

Finally, based on the second cumulative histogram generated for each pixel, a relation (a tone curve) between the input brightness value and output brightness value of each pixel is generated and an output brightness value is determined according to the input brightness value for each pixel (step S104). By determining the output brightness values of all pixels, an image including the output brightness values which are tone-transformed from the input brightness values is generated.

Figure 6A:
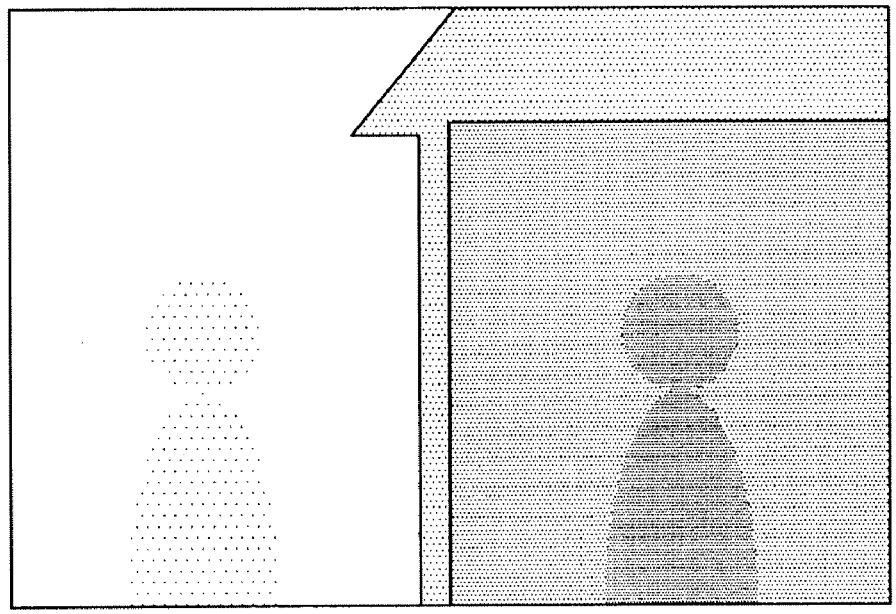
FIGS. 6A and 6B are explanatory diagrams showing examples of images.
Figure 6B:
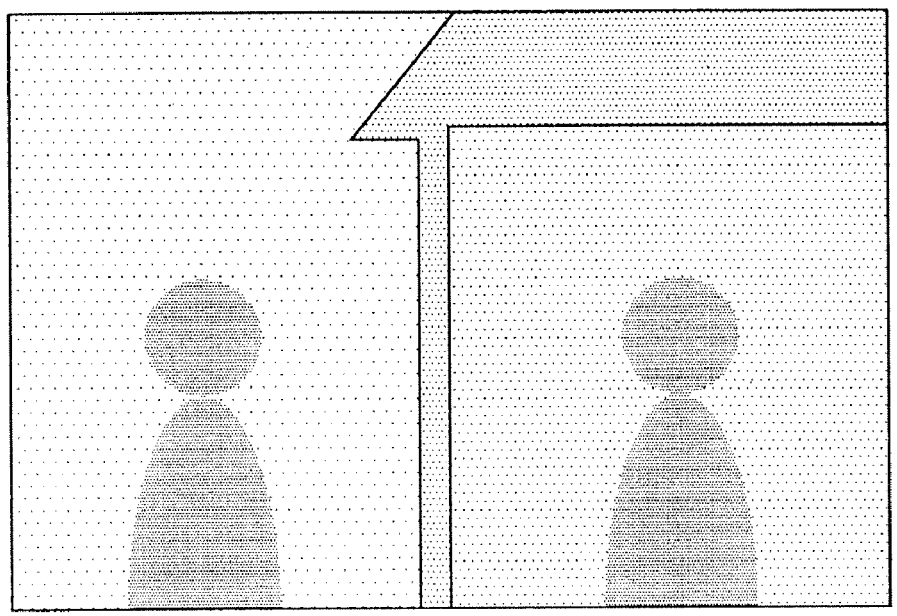

According to the processing operation of a series of tone transformation described above, the video processing unit 102 suppresses blanking-to-white and blanking-to-black in a wide dynamic range image or a high-contrast image, and the display device 100 can display a visibility-improved image as shown in FIG. 6B for example. Further, in the tone transformation processing according to this embodiment, an output brightness value is determined for each pixel; however, unlike the above document, a histogram is generated for each block or a histogram is generated using a small number of bins. As a result, the tone transformation processing according to this embodiment reduces a circuit load and is realized using an extremely small amount of resource.

[Weighting Process]

Figure 4:
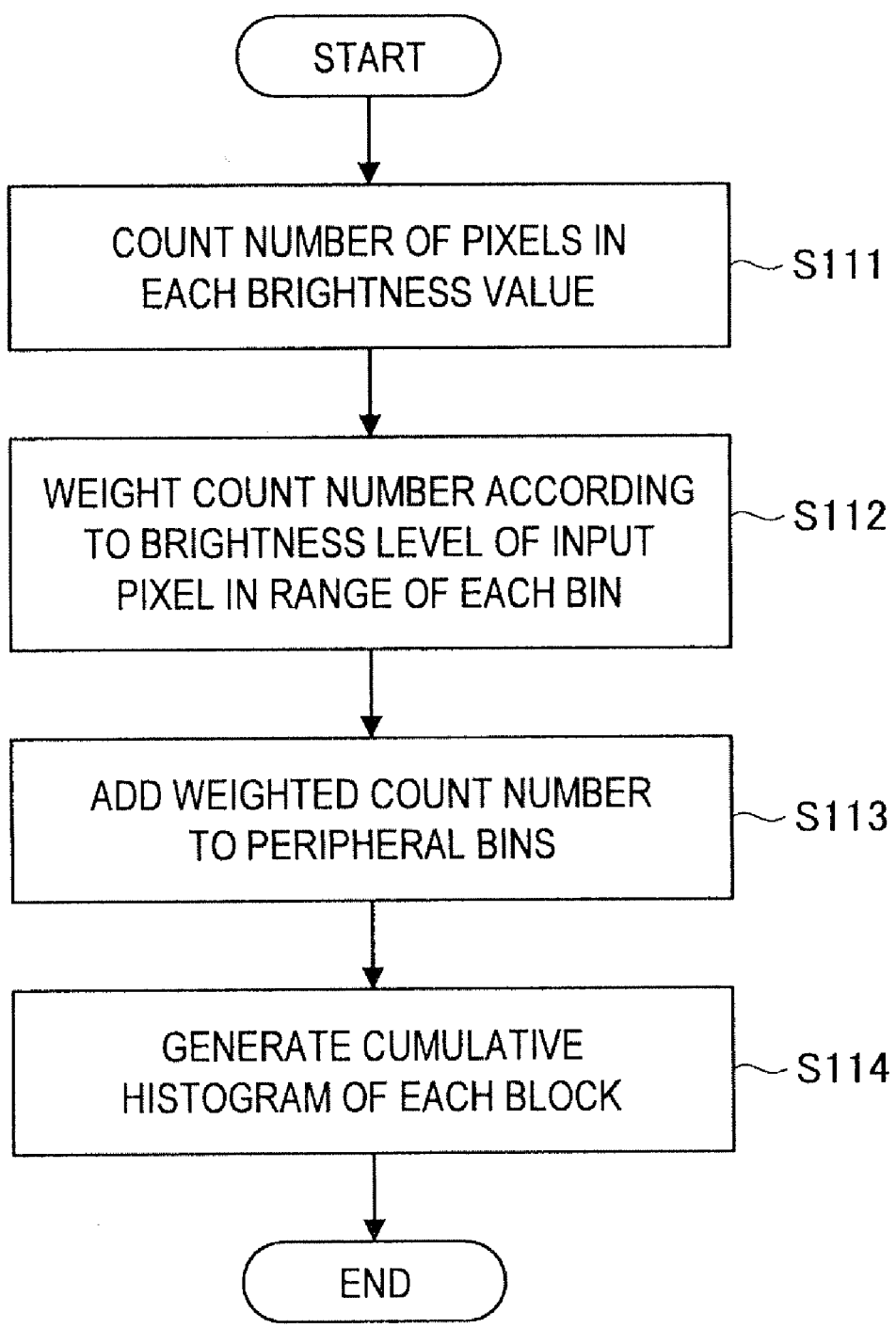
FIG. 4 is a flowchart showing a process of generating a cumulative histogram of each block according to the embodiment.

Next, a weighting process according to this embodiment will be explained with reference to FIG. 4. FIG. 4 is a flowchart showing a process for generating a cumulative histogram for each block according to this embodiment.

First, the number of pixels in each brightness value is counted for each block (step S111). The number of pixels of each brightness value is added to one of "N" number of bins. When a first cumulative histogram is generated, frequency (a count number) is weighted according to an input brightness value within a range of each bin (step S112).

Figure 8:
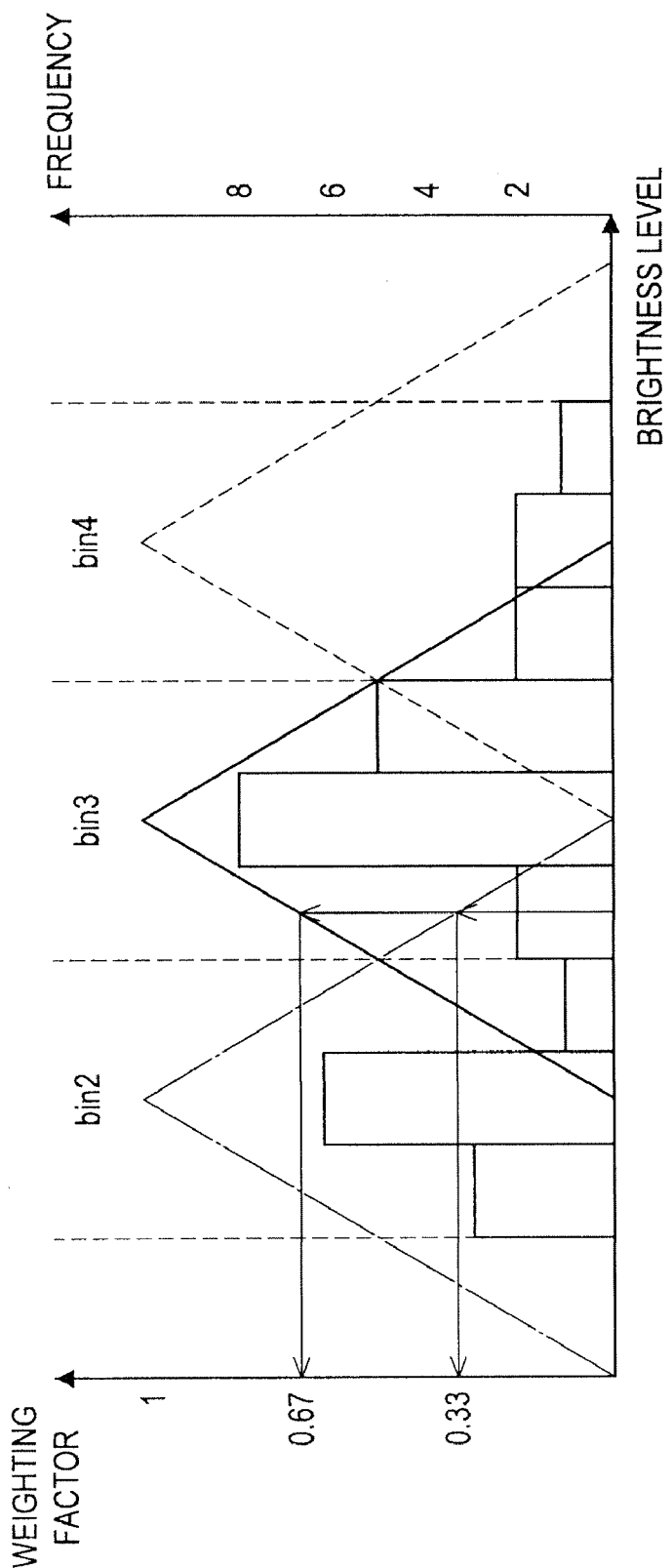
FIG. 8 is a graph showing a relation between weighting factors and brightness levels, and a histogram.

FIG. 8 is a graph showing a relation between a weighting factor and a brightness level, and a histogram. The histogram shown in FIG. 8 is a case where the width of a bin is formed of three brightness values. Then, in FIG. 8, the weighting factor of the brightness value at the center in each bin is "1" and the weighting factors of the brightness values at a left edge and a right edge of the bin are "0.67." A value obtained by multiplying a weighting factor to frequency of a brightness value is a weighted frequency.

Further, the brightness value near a border of each bin is also added to the frequency of brightness value of an adjacent bin (step S113). For example, in FIG. 8, regarding the brightness value at a border of a bin, a weighting factor is set to 0.33 and multiplied to the frequency. Then, the weighted frequency is added to the adjacent bin.

With the above series of operation, a first cumulative histogram shown in FIG. 9 is generated for each block (step S114). Note that the width of each bin of the histogram shown in FIG. 8 is an example and is not limited to the width of three brightness values. Further, the value of the weighting factor may be set according to the width of each bin and the like. Further, the weighted frequency may be added to peripheral bins located in both sides of one or more bins, in addition to the adjacent bins.

[Second Cumulative Histogram Generating Process]

Figure 5:
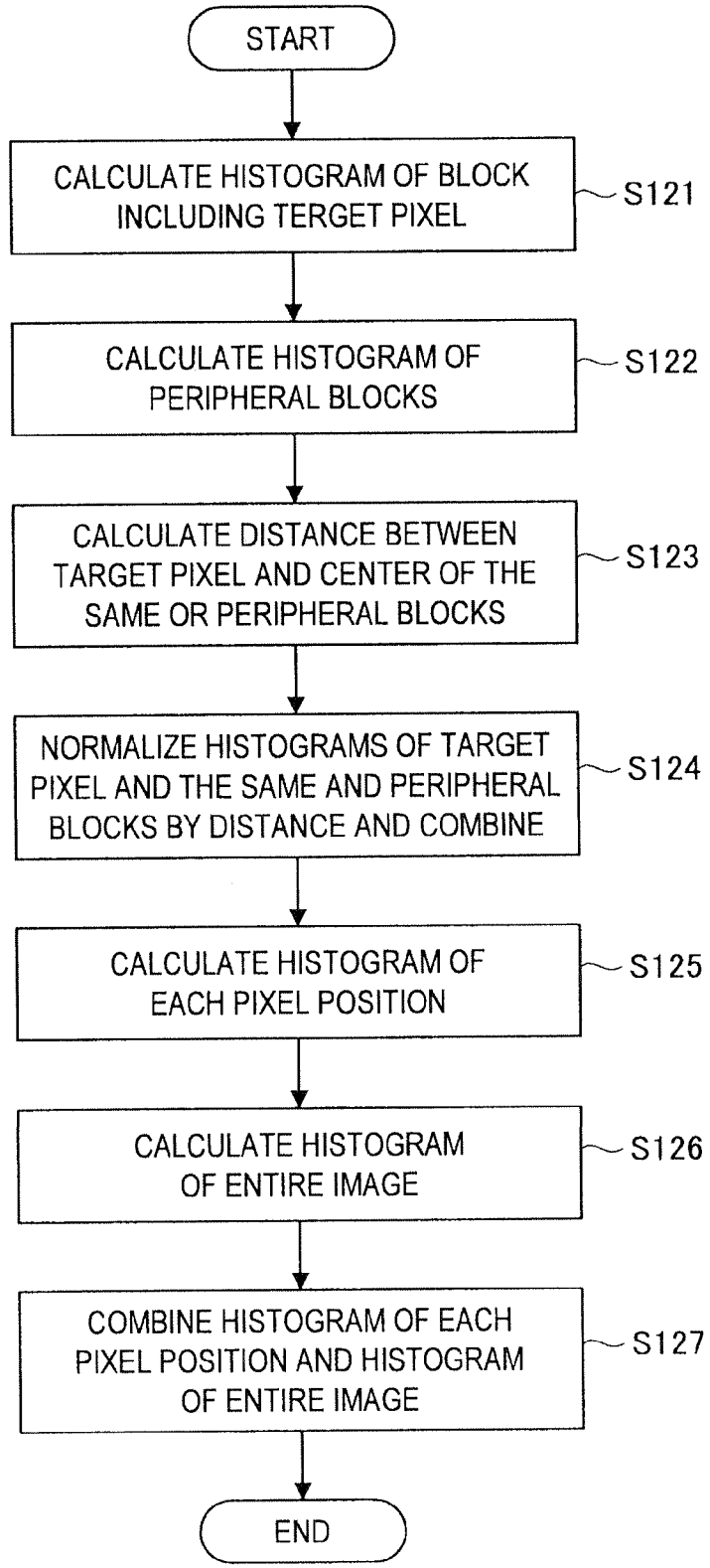
FIG. 5 is a flowchart showing a process of generating a cumulative histogram on a pixel basis according to the embodiment.

A process of generating a second cumulative histogram according to the embodiment will be explained with reference to FIG. 5. FIG. 5 is a flowchart showing a process of generating a cumulative histogram on a pixel basis according to this embodiment.

First, a first cumulative histogram of a block including a pixel to generate a cumulative histogram (hereinafter, referred to as a target pixel) is calculated (step S121). The first cumulative histogram is calculated in steps S111 to S114 explained by referring to FIG. 4 for example. Next, first cumulative histograms of peripheral blocks including the block of the target pixel and the adjacent block are generated (step S122).

Figure 10:
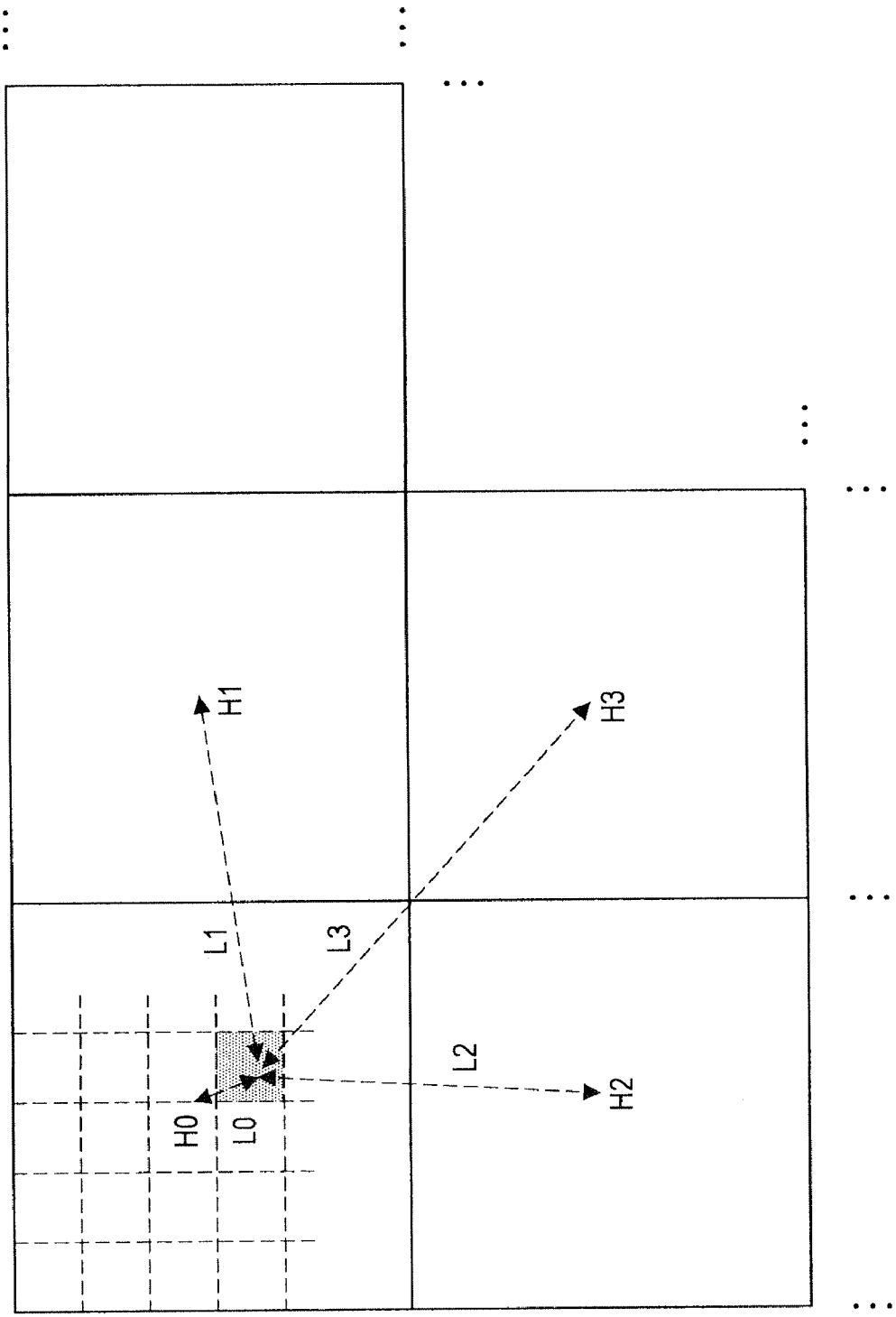
FIG. 10 is an explanatory diagram schematically showing pixels and blocks of an image.

Then, as shown in FIG. 10, a distance between the target pixel and the center of the block including the target pixel and distances between the target pixel and the centers of the peripheral blocks are calculated (step S123). FIG. 10 is an explanatory diagram schematically showing pixels and blocks in an image. In FIG. 10, a shaded pixel represents the target pixel, the distance between the target pixel and the center of the block including the target pixel is indicated by L0, and the distances between the target pixel and the centers of peripheral blocks are indicated by L1, L2 and L3.

Next, a first cumulative histogram of the block including the target pixel and first cumulative histograms of the peripheral blocks are normalized by the distances and combined for each pixel (step S124). When the histogram of the block including the target pixel is indicated by H0 and the histograms of the peripheral blocks are indicated by H1, H2 and H3, a histogram H generated for each target pixel is expressed in the following equation. In the following equation, a case where the target pixel (i, j)=(4, 4) shown in FIG. 10 is expressed.

$$H(4,4)=(H0/L0+H1/L1+H2/L2+H3/L3)/(1/L0+1/L1+1/L2+1/L3)$$

With this equation, the first cumulative histogram of the block including the target pixel and the first cumulative histograms of the peripheral blocks are normalized by the distances and combined to generate a cumulative histogram at a pixel position of each pixel (step S125). In other words, frequency of a pixel value depending on the pixel position of the target pixel in the block is calculated and a cumulative histogram of each pixel is calculated.

Further, frequency of pixel values of the entire image is calculated and a third cumulative histogram including the "N" number of bins, same as the first cumulative histogram, is generated (step S126). Then, the cumulative histogram at each pixel position generated in step S125 and the third cumulative histogram of the entire image are combined in a certain proportion (a proportion of 1 to 1) for example (step S127). As a result, a second cumulative histogram is generated. Here, the steps S126 and S127 may be omitted and, when those steps are omitted, the cumulative histogram at each pixel position generated in step S125 serves as a second cumulative histogram.

[Flicker Correction]

In this embodiment, in a case of a moving image, when there are high-brightness frames F2, F4 and F6 as shown in FIG. 13A, a flicker phenomenon in which brightness of a video instantaneously changes may occur. With the above series of processes according to this embodiment, the brightness of the entire image is corrected so that a predetermined range of brightness level is maintained in each frame image. Thus, this embodiment can correct a flicker phenomenon as shown in FIG. 13B, in addition to the above tone correction. FIGS. 13A and 13B are explanatory diagrams showing a plurality of frame images. In other words, this embodiment can adjust any brightness of images close to a predetermined brightness and reduce gaps among the frame images when the brightness differs between the frame images, thereby reducing the flicker phenomenon.

According to a related technique, in general, extremely large amount of hardware and software resources are used for a tone correction of each area or pixel. In contrast, since this embodiment suppresses blanking-to-white and blanking-to-black in a dynamic range image and a high-contrast image, the display device 100 can display a visibility-improved image as shown in FIG. 6B for example. Further, in the tone transformation processing of this embodiment, an output brightness value is determined for each pixel; however, when a histogram is generated for each block or a histogram is generated using a small number of bins, a circuit load is reduced and an extremely small resource is used, compared to a related technique.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-280877 filed in the Japan Patent Office on Dec. 10, 2009, the entire content of which is hereby incorporated by reference.

What is claimed is:

1. An image processing apparatus comprising:
a block histogram generation unit configured to calculate frequency of a pixel value in each block including plural pixels, divide a dynamic range into plural "N" numbers (N is an integer), and generate a first histogram including "N" number of bins having a width of plural pixels;
a pixel histogram generation unit configured to calculate frequency of a target pixel depending on a pixel position of the target pixel in a block based on the first histogram of the block including the target pixel and the first histogram of a block adjacent to the block including the target pixel, and generate a second histogram including "N" number of bins for each pixel; and
an output value determination unit configured to generate a relation between the pixel value and an output value of the pixel value based on the second histogram so that a maximum cumulative frequency of the second histogram matches a maximum value of the output value of the pixel value, and calculate the output value based on the pixel value of the target pixel.

2. The image processing apparatus according to claim 1, wherein the block histogram generation unit weights the frequency according to the pixel value.

3. The image processing apparatus according to claim 2, wherein the block histogram generation unit adds the frequency to a bin adjacent to the bin including the pixel value according to the pixel value.

4. The image processing apparatus according to claim 1, wherein the pixel histogram generation unit normalizes by a distance between the target pixel and a center of the adjacent block, combines the first histogram of the block including the target pixel and the first histogram of the block adjacent to the block including the target pixel, and generates the second histogram.

5. The image processing apparatus according to claim 1, wherein the pixel histogram generation unit calculates frequency of a pixel value of the entire image, divides a dynamic range into the plural "N" numbers (N is an integer) to generate a third histogram including "N" number of bins having a width of plural pixels, and generates the second histogram by combining the third histogram.

6. The image processing apparatus according to claim 1, wherein the relation between the pixel value and the output value of the pixel value is obtained by linking lines that connect frequencies of a minimum pixel value and a maximum pixel value within a single bin width.

7. An image processing method comprising the steps of:
calculating frequency of a pixel value of each block including plural pixels, dividing a dynamic range into plural "N" numbers (N is an integer), and generating a first histogram including "N" number of bins having a width of plural pixel values;
calculating frequency of a pixel value depending on a pixel position of a target pixel in a block based on the first histogram of the block including the target pixel and the first histogram of a block adjacent to the block including the target pixel, and generating a second histogram including "N" number of bins for each pixel; and
generating a relationship between the pixel value and an output value of the pixel value based on the second histogram so that a maximum cumulative frequency of the second histogram matches a maximum value of the output value of the pixel value, and calculating the output value based on the pixel value of the target pixel.

8. A program embedded on a non-transitory computer readable record medium to cause a computer to function as:
a means for calculating frequency of a pixel value of each block including plural pixels, dividing a dynamic range into plural "N" numbers (N is an integer), and generating a first histogram including "N" number of bins having a width of plural pixel values;
a means for calculating frequency of a pixel value depending on a pixel position of a target pixel in a block based on the first histogram of the block including the target pixel and the first histogram of a block adjacent to the block including the target pixel, and generating a second histogram including "N" number of bins for each pixel; and
a means for generating a relationship between the pixel value and an output value of the pixel value based on the second histogram so that a maximum cumulative frequency of the second histogram matches a maximum value of the output value of the pixel value, and calculating the output value based on the pixel value of the target pixel.

* * * * *